US008804071B2

(12) United States Patent
Ono et al.

(10) Patent No.: US 8,804,071 B2
(45) Date of Patent: Aug. 12, 2014

(54) LIQUID CRYSTAL DISPLAY DEVICE

(75) Inventors: Kikuo Ono, Chiba (JP); Ikuko Imajo, Chiba (JP); Yoshinori Ohshima, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 160 days.

(21) Appl. No.: 13/289,366

(22) Filed: Nov. 4, 2011

(65) Prior Publication Data
US 2012/0113355 A1 May 10, 2012

(30) Foreign Application Priority Data

Nov. 9, 2010 (JP) ................................ 2010-250985

(51) Int. Cl.
*G02F 1/1335* (2006.01)
(52) U.S. Cl.
USPC ............................................. 349/65; 349/62
(58) Field of Classification Search
USPC .......................................................... 349/65
See application file for complete search history.

(56) References Cited

U.S. PATENT DOCUMENTS

| 7,300,177 | B2 * | 11/2007 | Conner | 362/244 |
| 7,427,146 | B2 * | 9/2008 | Conner | 362/268 |
| 7,719,016 | B2 * | 5/2010 | Nada et al. | 257/95 |
| 7,955,879 | B2 * | 6/2011 | Kim | 438/29 |
| 2006/0152931 | A1 * | 7/2006 | Holman | 362/297 |
| 2006/0195293 | A1 * | 8/2006 | Koike et al. | 702/159 |
| 2006/0221592 | A1 * | 10/2006 | Nada et al. | 362/29 |
| 2007/0019394 | A1 * | 1/2007 | Park et al. | 362/29 |
| 2007/0247833 | A1 * | 10/2007 | Lee et al. | 362/97 |
| 2007/0279352 | A1 * | 12/2007 | Tanaka | 345/87 |
| 2008/0158875 | A1 * | 7/2008 | Kim et al. | 362/231 |
| 2008/0170415 | A1 * | 7/2008 | Han et al. | 362/612 |
| 2009/0059621 | A1 * | 3/2009 | Takahashi et al. | 362/619 |
| 2009/0147537 | A1 * | 6/2009 | Iwasaki | 362/620 |
| 2009/0278151 | A1 * | 11/2009 | Kim | 257/98 |
| 2009/0316072 | A1 * | 12/2009 | Okumura et al. | 349/64 |
| 2010/0002169 | A1 * | 1/2010 | Kuramitsu et al. | 349/65 |
| 2010/0079980 | A1 * | 4/2010 | Sakai | 362/97.1 |
| 2011/0026242 | A1 * | 2/2011 | Ryu et al. | 362/97.1 |
| 2011/0194034 | A1 | 8/2011 | Shimizu | |
| 2011/0210367 | A1 * | 9/2011 | Kim | 257/98 |
| 2012/0087126 | A1 * | 4/2012 | Takeuchi et al. | 362/249.01 |

(Continued)

FOREIGN PATENT DOCUMENTS

JP 02077726 A * 3/1990 ............ G02F 1/1335
JP 2007-286627 11/2007

(Continued)

*Primary Examiner* — Kaveh Kianni
(74) *Attorney, Agent, or Firm* — Hamre, Schumann, Mueller & Larson, P.C.

(57) ABSTRACT

A light source section provided in a backlight unit has a smaller width in a direction perpendicular to a length direction of the light source section than a width in the same direction of the liquid crystal panel. A plurality of LED modules are arranged along the length direction of the light source section. The LED modules are respectively assigned to areas of the liquid crystal panel, which are extended in the width direction of the light source section. Lenses are respectively disposed over the LED modules and expand light toward the areas. A control device controls each of the plurality of light sources separately or each of groups into which the plurality of light sources are divided, separately. Accordingly, it is possible to improve a contrast of a display screen, while reducing the number of light sources.

9 Claims, 8 Drawing Sheets

(56) References Cited

U.S. PATENT DOCUMENTS

| | | | |
|---|---|---|---|
| 2012/0105764 A1* | 5/2012 | Yokota | 349/61 |
| 2012/0120343 A1* | 5/2012 | Yamamoto | 349/61 |
| 2012/0126261 A1* | 5/2012 | Shimizu | 257/88 |
| 2012/0154713 A1* | 6/2012 | Kwon | 349/64 |
| 2012/0287352 A1* | 11/2012 | Takata | 348/739 |
| 2012/0327311 A1* | 12/2012 | Kuromizu | 348/739 |
| 2013/0010494 A1* | 1/2013 | Arai | 362/608 |
| 2013/0214674 A1* | 8/2013 | Inoguchi | 313/498 |

FOREIGN PATENT DOCUMENTS

| | | |
|---|---|---|
| JP | 2008-096765 | 4/2008 |
| JP | 2009158274 A  * | 7/2009 |
| JP | 2010-009785 | 1/2010 |
| JP | 2010-092686 | 4/2010 |
| WO | 2010/058625 | 5/2010 |

* cited by examiner

LIQUID CRYSTAL DISPLAY DEVICE

CROSS-REFERENCE TO RELATED APPLICATION

The present application claims priority from Japanese application JP 2010-250985 filed on Nov. 9, 2010, the content of which is hereby incorporated by reference into this application.

BACKGROUND OF THE INVENTION

1. Field of the Invention

The present invention relates to a liquid crystal display device, and more particularly, to a technology for improving a contrast of a display while reducing the number of light sources of a backlight unit.

2. Description of the Related Art

Japanese Patent Application Laid-open No. 2007-286627 discloses a liquid crystal display device including a direct type backlight unit. In the above liquid crystal display device, a plurality of light emitting diodes (LEDs) are used as light sources of the backlight unit. The LEDs are arranged in matrix over the entire of the backlight unit. Further, the above backlight unit curries out area control for the LEDs, for the purpose of improvement in contrast of the display. That is, a liquid crystal panel is sectioned into a plurality of partial areas, and the luminance of the LEDs is controlled for each of the partial areas.

SUMMARY OF THE INVENTION

However, in Japanese Patent Application Laid-open No. 2007-286627, the LEDs are arranged over the entire of the backlight unit, and hence a large number of LEDs are necessary, which is not preferred in terms of cost.

The present invention has an object to provide a liquid crystal display device capable of improving a contrast of a display screen, while reducing the number of light sources in a backlight unit.

A liquid crystal display device according to the present invention includes: a liquid crystal panel; a backlight unit including a light source section facing a rear surface of the liquid crystal panel, and a plurality of light sources arranged on the light source section; and a control device for controlling luminance of the plurality of light sources. The light source section has a smaller width in a first direction than a width in the first direction of the liquid crystal panel. The plurality of light sources are aligned along a second direction perpendicular to the first direction. The plurality of light sources are respectively assigned to a plurality of areas, the plurality of areas being defined on the liquid crystal panel and respectively extended in the first direction. The plurality of light sources have lenses respectively disposed thereover and expanding light from the plurality of light sources toward the plurality of areas of the liquid crystal panel, respectively. The control device controls each of the plurality of light sources separately or each of groups into which the plurality of light sources are divided, separately.

According to the above aspect, it is possible to improve the contrast of the display screen, while reducing the number of the light sources.

In an aspect of the present invention, the lenses may be so formed as to expand the light emitted from the plurality of light sources concentratedly in the first direction. According to the above aspect, it is easy to ensure the intensity of the light directed toward each area on the liquid crystal panel.

In this aspect, the lenses may include first lenses and second lenses, and the first lenses may be so formed as to expand the light emitted from the corresponding light sources concentratedly toward one side in the first direction. Further the second lens may be so formed as to expand the light emitted from the corresponding light sources concentratedly toward the other side in the first direction. With this aspect, it is possible to reduce the area on the liquid crystal panel in a size in the first direction. As a result, it is possible to improve the luminance of each of the areas.

Further, in an aspect of the present invention, the light source section may directly face a center portion of the liquid crystal panel which is defined as a center portion in the first direction. According to this aspect, the number of the light sources may be easily reduced. In this aspect, the liquid crystal display device further comprising a plurality of optical sheets arranged between the light source section and the liquid crystal panel. According to this structure, the light emitted from the plurality of light sources arranged on the light source section may be easily expanded in a wide range of the liquid crystal panel.

Further, in an aspect of the present invention, the light source section may comprises a reflective sheet for reflecting light from the plurality of light sources toward the liquid crystal panel, and the reflective sheet may be curved such that the reflective sheet swells toward the opposite side to the liquid crystal panel. According to this aspect, the light emitted from the plurality of light sources may be easily directed toward the liquid crystal panel.

Further, in an aspect of the present invention, the plurality of light sources on the light source section may be aligned in one line. According to this aspect, it is possible to surely reduce the number of the light sources.

Further, in an aspect of the present invention, the plurality of light sources on the light source section may be aligned in two lines. According to this aspect, it is possible to surely reduce the number of the light sources.

DETAILED DESCRIPTION OF THE INVENTION

Figure 1:
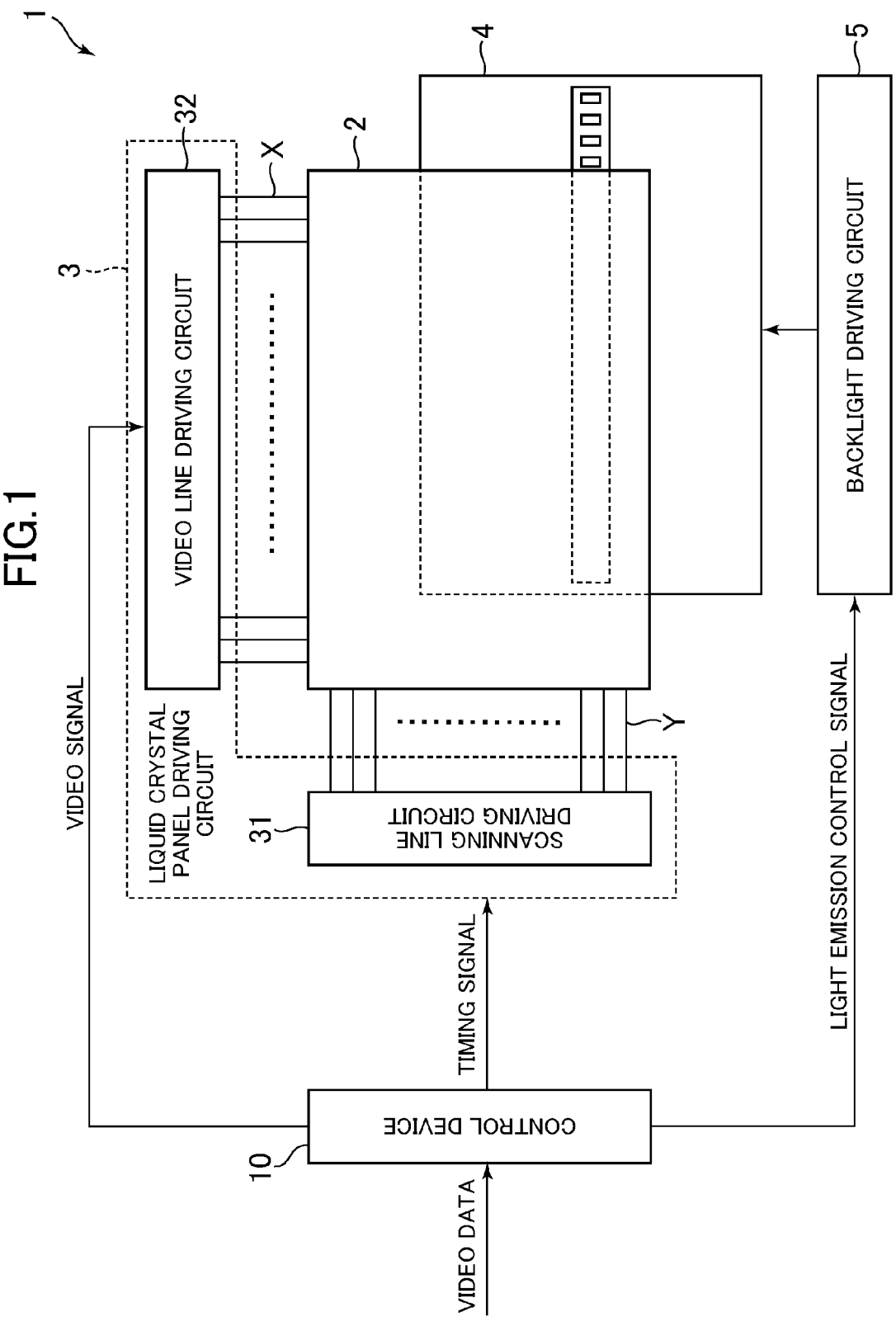
FIG. 1 is a diagram illustrating a configuration of a liquid crystal display device according to an embodiment of the present invention.
Figure 2:
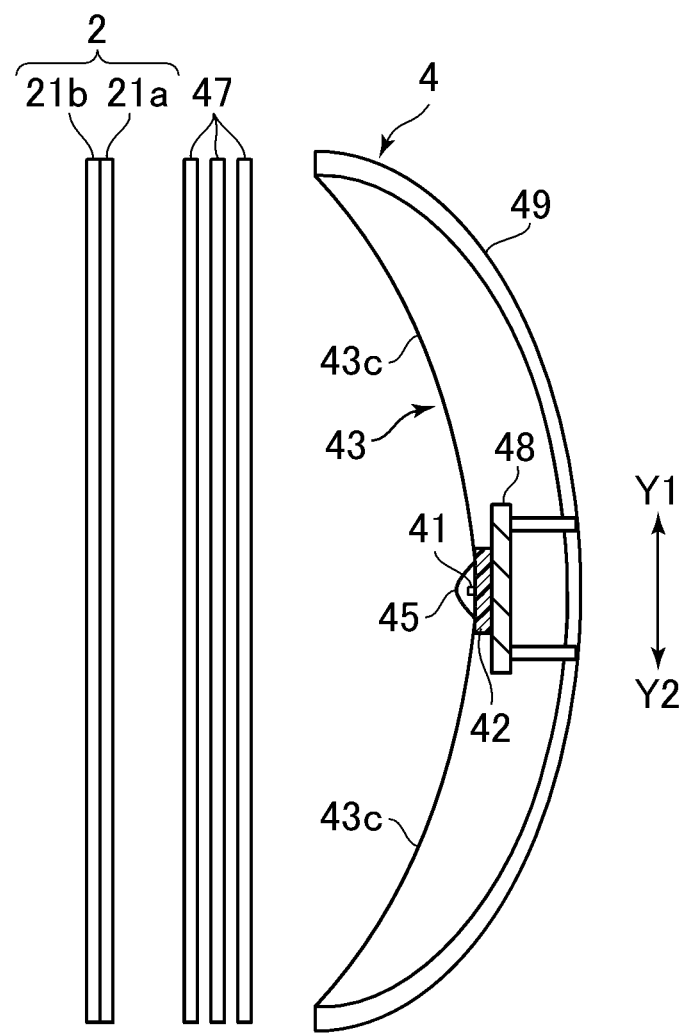
FIG. 2 is a schematic cross-sectional view of a liquid crystal panel and a backlight unit included in the above-mentioned liquid crystal display device.
Figure 3:
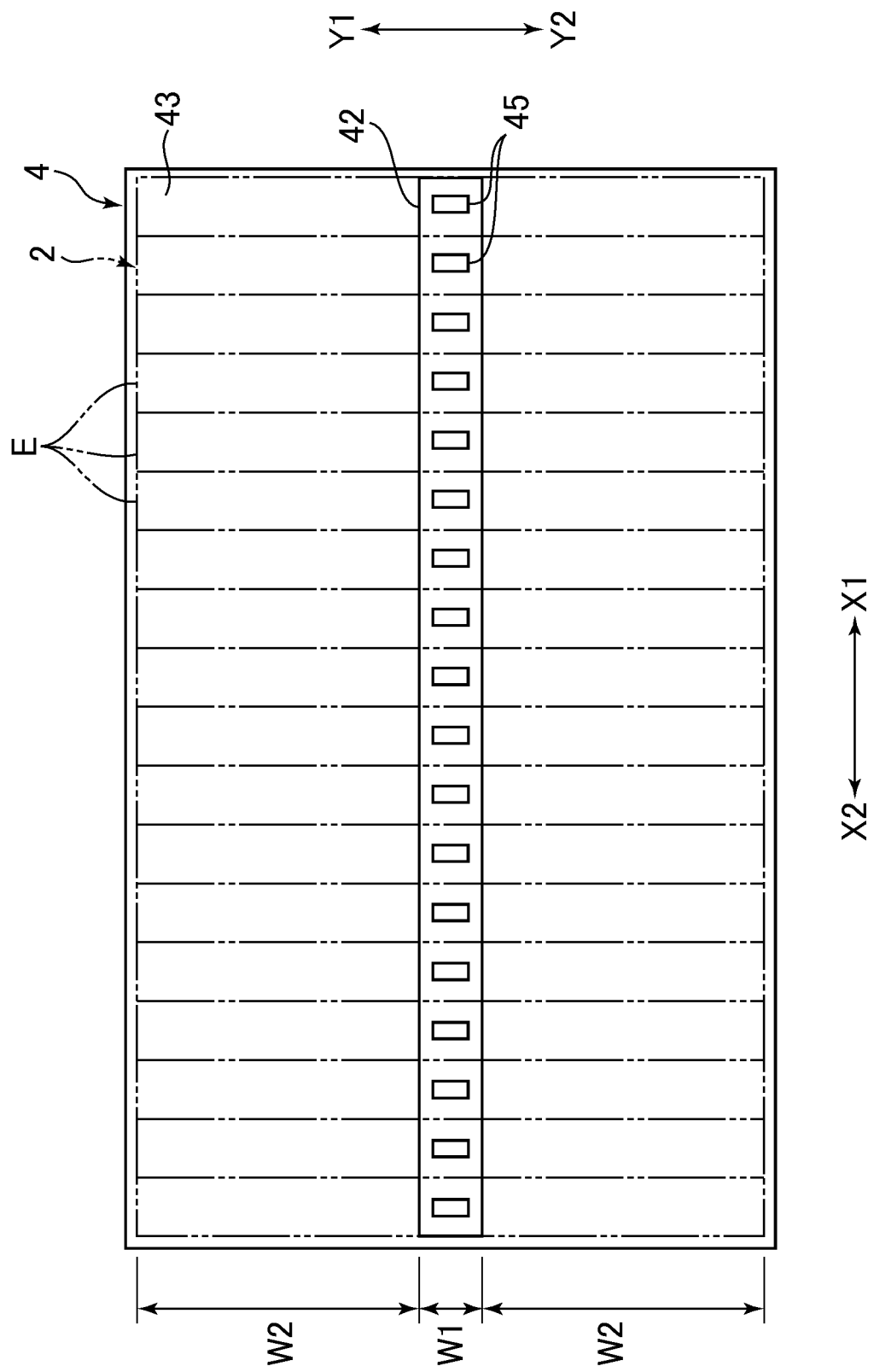
FIG. 3 is a front view of the backlight unit included in the above-mentioned liquid crystal display device.
Figure 4:
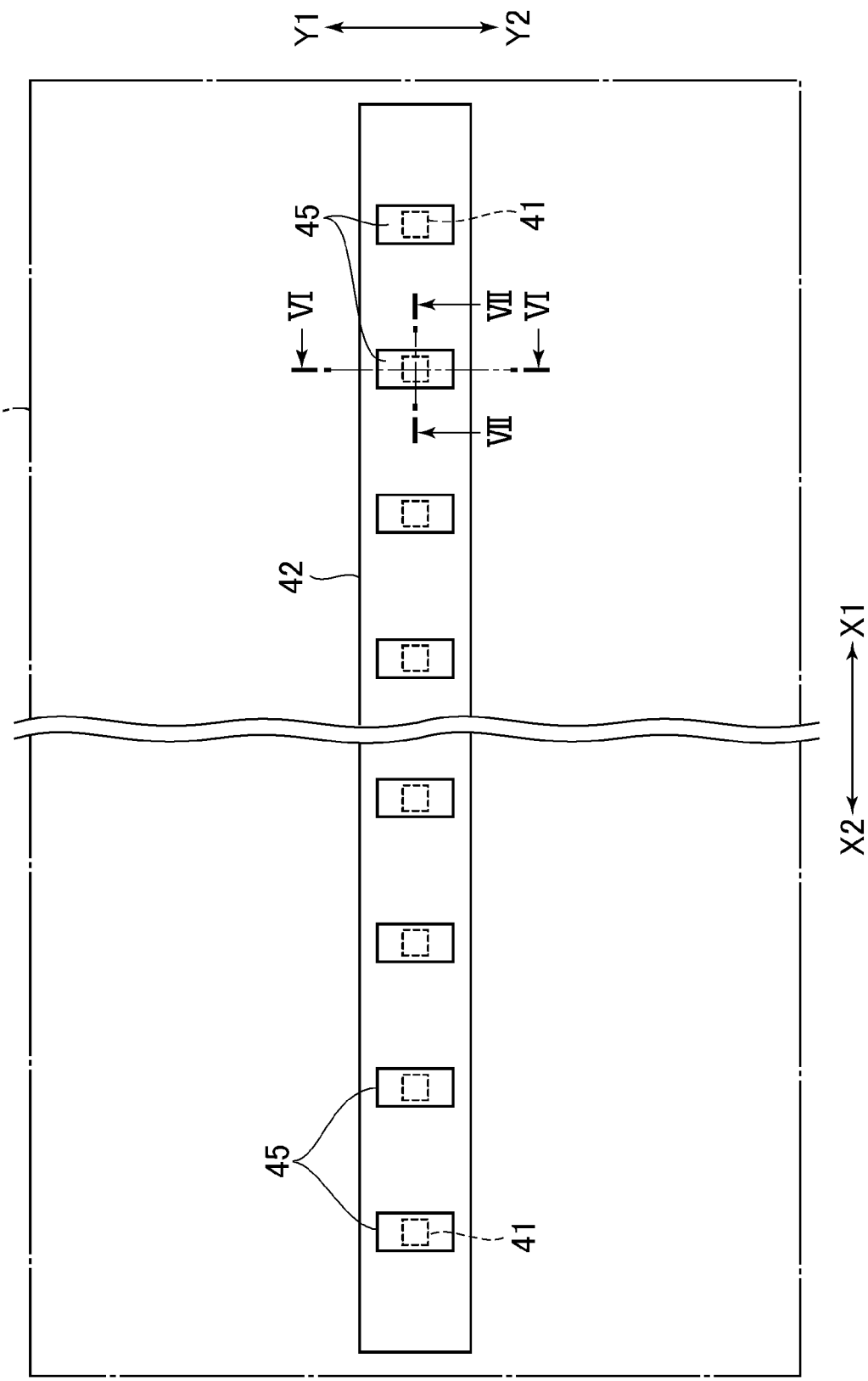
FIG. 4 is a front view of a substrate (light source section) provided in the backlight unit included in the above-mentioned liquid crystal display device.

Hereinafter, an embodiment rerated to the present invention is described with reference to the drawings. FIG. 1 is a diagram illustrating a configuration of a liquid crystal display device 1, which is an example of the embodiment. FIG. 2 is a schematic cross-sectional view of a liquid crystal panel 2 and a backlight unit 4 included in the liquid crystal display device 1. FIG. 3 is a front view of the backlight unit 4 included in the liquid crystal display device 1, and FIG. 4 is a front view of a substrate (light source section) 42 provided in the backlight unit 4. In the following explanation, X1-X2 direction indicated in FIG. 3 corresponds to the lateral direction of the liquid crystal panel 2. X1 direction and X2 direction respectively correspond to the rightward direction and the leftward direction. Further, Y1-Y2 direction indicated in FIG. 3 corresponds to the longitudinal direction of the liquid crystal panel 2. Y1 direction and Y2 direction respectively correspond to the upward direction and the downward direction of the liquid crystal panel 2.

As illustrated in FIGS. 1 and 2, the liquid crystal display device 1 includes a control device 10, the liquid crystal panel 2, and a liquid crystal panel driving circuit 3. The liquid crystal panel driving circuit 3 includes a scanning line driving circuit 31 and a video line driving circuit 32. Further, the liquid crystal display device 1 includes the backlight unit 4 and a backlight driving circuit 5.

The liquid crystal panel 2 has a rectangular shape, and hence the width of the liquid crystal panel 2 in the lateral direction (X1-X2 direction indicated in FIG. 3) is larger than the width thereof in the longitudinal direction (Y1-Y2 direction indicated in FIG. 3).

The liquid crystal panel 2 includes a pair of transparent substrates (specifically, glass substrates) 21a and 21b (see FIG. 2). On one substrate (hereinafter, referred to as TFT substrate) 21a, a plurality of video signal lines X and a plurality of scanning lines Y are formed. The video signal lines X and the scanning lines Y are formed perpendicular to each other to thereby form a grid pattern. Each area surrounded by adjacent two video signal lines X and adjacent two scanning lines Y corresponds to one pixel. Further, each pixel has a thin film transistor (TFT) (not shown) formed therein. The TFT is turned ON by a scanning signal input through the scanning line Y, to thereby apply, to an electrode of each pixel, a voltage (signal representing a gray scale value for the pixel) applied through the video signal line X.

A color filter is formed on the other substrate 21b. Liquid crystal (not shown) is sealed between the two substrates 21a and 21b. Polarization filters (not shown) are respectively attached to a display surface of the liquid crystal panel 2 and a rear surface which is the opposite surface to the display surface.

Video data received by a tuner or an antenna (not shown) or video data generated in an external device such as a video reproducing device is input into the control device 10. The control device 10 includes a central processing unit (CPU) and a memory such as a read only memory (ROM) and a random access memory (RAM). The control device 10 performs various types of image processing for the input video data, such as color adjustment, and generates a video signal representing a gray scale value for each pixel. The control device 10 outputs the generated video signal to the video line driving circuit 32. Further, the control device 10 generates, based on the input video data, a timing signal for synchronizing the video line driving circuit 32, the scanning line driving circuit 31, and the backlight driving circuit 5, and outputs the generated timing signal to the respective driving circuits.

Further, as described later, the backlight unit 4 is provided with a plurality of LED modules (light sources) 41 (see FIG. 4). The control device 10 generates a signal for controlling the luminance of the LED modules 41 based on the input video data. Then, the control device 10 outputs the generated signal to the backlight driving circuit 5. In this embodiment, the control device 10 controls each of the LED modules 41 separately or each of a groups into which the plurality of LED modules 41 is divided, separately. The control of the LED modules 41 by the control device 10 is described in detail later.

The scanning line driving circuit 31 is connected to the scanning lines Y formed on the TFT substrate 21a. The scanning line driving circuit 31 selects the scanning lines Y in regular order in accordance with the timing signal input from the control device 10, and then the selected scanning line Y is applied with a voltage. When the voltage is applied to the scanning line Y, the TFTs connected to the scanning line Y are turned ON.

The video line driving circuit 32 is connected to the video signal lines X formed on the TFT substrate 21a. In response to a selection of a scanning line Y, the video line driving circuit 32 applies a voltage corresponding to a video signal through the video signal lines X to each of the TFTs connected to the selected scanning line Y.

The backlight unit 4 is arranged on the rear side of the liquid crystal panel 2. The backlight unit 4 has a rectangular shape, and the size thereof is designed accordingly to that of the liquid crystal panel 2. Similarly to the liquid crystal panel 2, the width of the backlight unit 4 in the lateral direction is larger than the width thereof in the longitudinal direction.

As illustrated in FIGS. 2 and 4, the backlight unit 4 includes the plurality of LED modules (light sources) 41. The LED modules 41 emit light toward the rear surface of the liquid crystal panel 2. Each LED module 41 includes an LED chip (light emitting element), a reflector for reflecting the light emitted from the LED chip, and an encapsulation resin, which encapsulates the LED chip and has light transmissive property.

As illustrated in FIGS. 3 and 4, the backlight unit 4 includes an elongated substrate (light source section) 42 onto which the plurality of LED modules 41 are mounted. The plurality of LED modules 41 are aligned in a length direction of the substrate 42. In the example described here, the plurality of LED modules 41 are aligned in one line in the length direction of the substrate 42. The substrate 42 includes an insulating substrate such as glass epoxy, paper phenol, and paper epoxy. The backlight unit 4 is a direct type backlight unit, and thus the substrate 42 faces the rear surface of the liquid crystal panel 2.

The substrate 42 in this example is elongated in the lateral direction (X1-X2 direction). The substrate 42 has a smaller width in a direction (a first direction referred in claims, Y1-Y2 direction) perpendicular to the length direction (a second direction referred in claims, X1-X2 direction) of the substrate 42 than the width of the liquid crystal panel 2 and the width of the backlight unit 4 in the same direction (the direction perpendicular to the length direction of the substrate 42 is referred to as a width direction of the substrate 42). That is, the substrate 42 has a smaller width in the longitudinal direction of the liquid crystal panel 2 than the width of the liquid crystal panel 2 and the width of the backlight unit 4 in the same direction. In this example, the substrate 42 is formed into a band shape. The width in the width direction of the substrate 42 is smaller than half of the width of the liquid crystal panel 2 in the width direction and half of the width of the backlight unit 4 in the width direction. Particularly in this example, the width of the substrate 42 is smaller than one-third of the width of the liquid crystal panel 2 and one-third of the width of the backlight unit 4.

As illustrated in FIG. 3, the substrate 42 is arranged such that the length direction thereof is along an edge of the liquid crystal panel 2. That is, the substrate 42 is arranged such that the length direction thereof is along the lateral direction or the longitudinal direction of the liquid crystal panel 2. In this example, the substrate 42 is elongated in the lateral direction, and thus the length direction of the substrate 42 is along the upper and lower edges of the liquid crystal panel 2. Further, the substrate 42 is arranged substantially at a center position in the longitudinal direction of the backlight unit 4. In other words, the light source section is formed only at the center position in the longitudinal direction of the backlight unit 4, and the light source section is not formed at any other positions. As a result, the liquid crystal panel 2 has, at the center portion in the longitudinal direction thereof, a area straightly (directly) facing the LED modules 41 (hereinafter, referred to as opposing area). Further, the liquid crystal panel 2 has, at an upper and lower portions thereof, areas that have no LED modules 41 straightly facing thereto (hereinafter, referred to as non-opposing areas). A width W2 in the longitudinal direction of each of the non-opposing areas is larger than a width W1 of the opposing area. Incidentally, the substrate 42 may have an elongate shape that is long in the longitudinal direction of the backlight unit 4 and the liquid crystal panel 2. In this case, the substrate 42 is placed, e.g., in a center area in the lateral direction of the backlight unit 4.

As illustrated in FIG. 2, the backlight unit 4 includes a housing 49 forming the rear surface of the backlight unit 4. The housing 49 in this example is curved such that the center in the longitudinal direction thereof swells toward the rear side. The substrate 42 is supported by the housing 49. Specifically, the substrate 42 is mounted to an attachment plate 48, and the attachment plate 48 is fixed on the inner side of the housing 49.

The backlight unit 4 further includes a reflective sheet 43. The reflective sheet 43 has, in plan view, a rectangular shape with a size corresponding to that of the liquid crystal panel 2. Further, the reflective sheet 43 in this example is curved or folded such that the center in the longitudinal direction thereof swells toward the rear side. Accordingly, the reflective sheet 43 gets gradually closer to the liquid crystal panel 2 as it becomes more distant from the substrate 42 in the longitudinal direction of the liquid crystal panel 2. The reflective sheet 43 is also housed in the housing 49.

The LED modules 41 are positioned on the front surface (reflective surface) side of the reflective sheet 43. Therefore, the light emitted from the LED modules 41 is not only directly directed toward the liquid crystal panel 2, but is reflected on the front surface of the reflective sheet 43 toward the rear surface of the liquid crystal panel 2.

As illustrated in FIG. 2, the reflective sheet 43 includes inclined surface portions 43c on upper and lower sides of the substrate 42. The inclined surface portions 43c are extended upwardly and downwardly from the substrate 42 and are inclined forward (that is, toward the liquid crystal panel 2).

The substrate 42 is positioned on the rear surface of the reflective sheet 43. The reflective sheet 43 is formed so as to avoid the positions of the LED modules 41. Specifically, the reflective sheet 43 has a plurality of holes formed therein. The reflective sheet 43 is overlapped on the front surface of the substrate 42, and each LED modules 41 is positioned inside the hole formed in the reflective sheet 43.

Further, as illustrated in FIG. 2, the backlight unit 4 includes a plurality of optical sheets 47. The optical sheets 47 are positioned between the LED modules 41 and the liquid crystal panel 2. The optical sheets 47 include a diffusion sheet for diffusing the light emitted from the LED modules 41 and a prism sheet.

Figure 5:
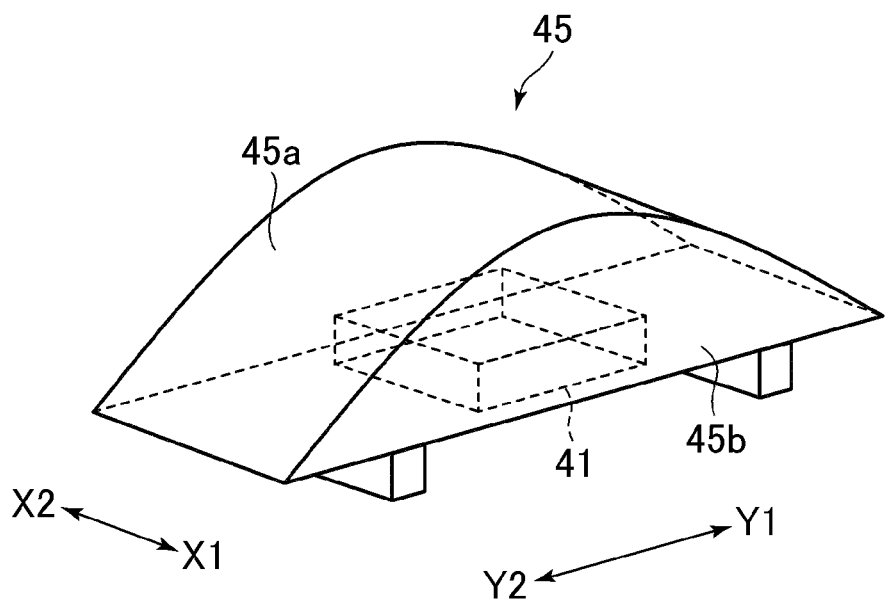
FIG. 5 is a perspective view of a lens disposed over an LED module of the above-mentioned backlight unit.
Figure 6:
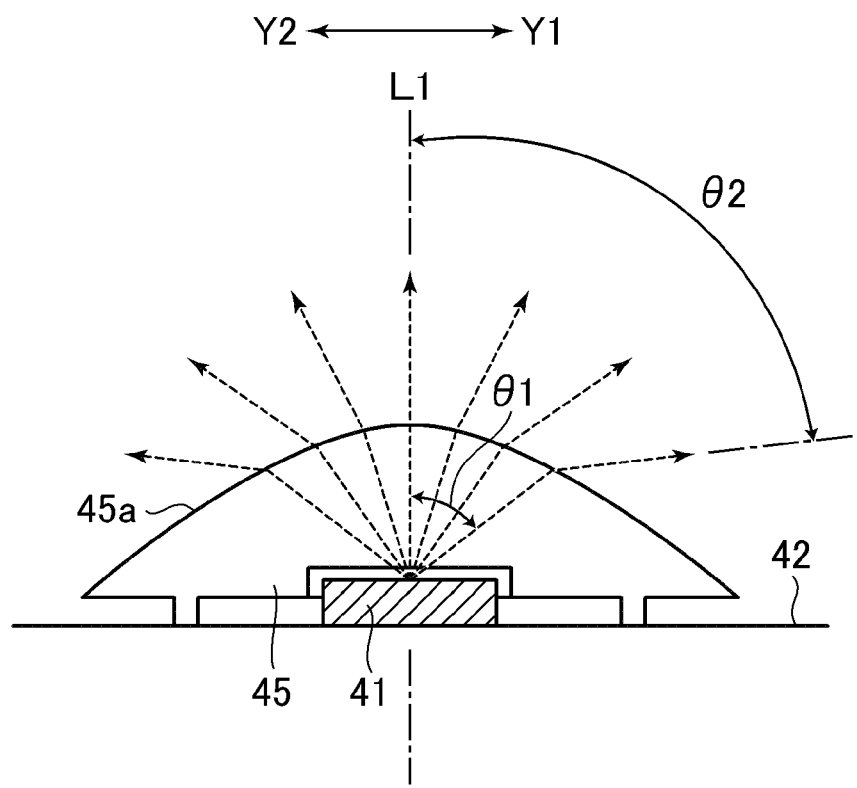
FIG. 6 is a cross-sectional view taken along the line VI-VI of FIG. 4.
Figure 7:
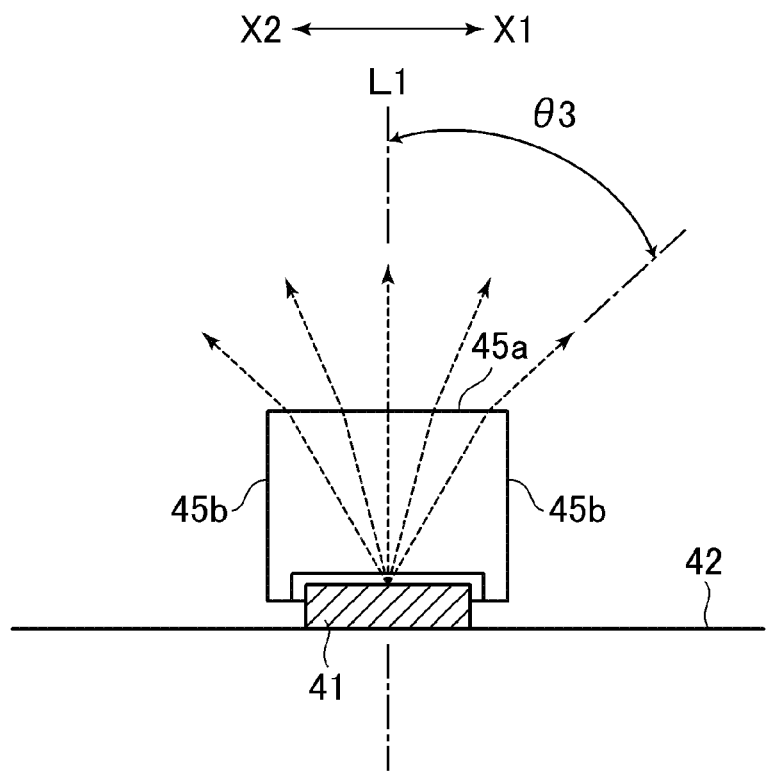
FIG. 7 is a cross-sectional view taken along the line VII-VII of FIG. 4.

As illustrated in FIG. 4, the backlight unit 4 includes a lens 45, which is separately manufactured from the LED module 41. FIG. 5 is a perspective view of the lens 45, FIG. 6 is a cross-sectional view taken along the line VI-VI of FIG. 4, and FIG. 7 is a cross-sectional view taken along the line VII-VII of FIG. 4.

The lens 45 is disposed over the LED module 41, and thus the light emitted from the LED module 41 enters the lens 45. The light emitted from the LED module 41 is transmitted through the lens 45, and exits toward the rear surface of the liquid crystal panel 2. In this example, plural lenses 45 are respectively disposed over the LED modules 41. The lens 45 is larger than the LED module 41 in plan view, and covers the LED module 41.

The lens 45 enlarges the divergence angle (exit angle range, for example, $\theta 1$ in FIG. 6) of light emitted from the LED module 41. The divergence angle is an angle representing the expanse of light emitted from each of the LED modules 41. The divergence angle is, for example, an angle with reference to an optical axis of the LED module 41 (straight line L1 in FIGS. 6 and 7, corresponding to a straight line which passes through the center of the LED module 41 and is perpendicular to the substrate 42).

As illustrated in FIG. 3, the liquid crystal panel 2 is sectioned into a plurality of partial areas E. The entire of the liquid crystal panel 2 is covered with the entire of the plurality of partial areas E. The LED modules 41 are respectively assigned to the partial areas E. That is, every LED module 41 is associated with a partial area E toward which the LED module 41 desirably directs the light thereof. One LED module 41 may be associated with one partial area E, or a plurality of LED modules 41 may be associated with the one partial area E. In other words, every partial area E is associated with one or more LED modules 41.

As illustrated in FIG. 3, the partial area E is elongated in the width direction of the substrate 42. In the example of FIG. 3, the partial area E is a substantially rectangular area elongated in the width direction of the substrate 42 (that is, longitudinal direction Y1-Y2 of the liquid crystal panel 2). As described above, the plurality of LED modules 41 are aligned in the length direction of the substrate 42 (that is, lateral direction X1-X2). The plurality of partial areas E are also aligned in the length direction of the substrate 42 in conformity to the arrangement of the LED modules 41. Note that, the shape of the partial area E is not limited to the shape illustrated in FIG. 3. For example, the width of the partial area E may gradually increase as the distance from the substrate 42 increases. Further, each partial area E may be defined to have a portion overlapping with the adjacent partial area E.

The lens 45 expands the light emitted from the LED module 41 concentratedly toward the partial area E assigned to the same LED module 41. That is, as illustrated in FIGS. 6 and 7, the lens 45 expands the light such that the divergence angle of the light is not equally enlarged in all radial directions around the optical axis L1, but is enlarged biasedly in a direction in which the partial area E is elongated. In this example, the partial area E is elongated in the longitudinal direction. Therefore, the lens 45 enlarges the divergence angle of the light concentrated in the longitudinal direction, and then emits the light concentratedly toward the upper side and the lower side of the substrate 42. As a result, the divergence angle of the light in the longitudinal direction (θ2 in FIG. 6) is larger than the divergence angle enlarged in any other directions (for example, the divergence angle in the lateral direction (θ3 in FIG. 7)).

The light which exits from the lens 45 upwardly and downwardly is reflected by the inclined surface portions 43c of the reflective sheet 43. Thus, the reflected light is applied to areas of the liquid crystal panel 2 (for example, upper or lower end areas of the partial area E), at which no LED modules 41 are provided face to face.

As illustrated in FIG. 5, a light exiting surface (upper surface) 45a of the lens 45 is a curved surface swelling toward the liquid crystal panel 2. The light exiting surface 45a has an inclined surface which is extended upwardly and downwardly from a top of the lens 45 and gradually approaches the substrate 42. Incidentally, the light exiting surface 45a is a trajectory which a straight line parallel to the lateral direction can form in its parallel translation. Further, the lens 45 has a pair of side surfaces 45b (see FIG. 7) facing opposite sides to each other. The side surfaces 45b are extended downwardly from the right and left edges of the light exiting surface 45a toward the substrate 42. In this example, the side surfaces 45b are flat surfaces formed perpendicularly to the substrate 42, and are substantially parallel to the optical axis of the LED module 41. Therefore, the expanse of the divergence angle in the length direction of the substrate 42 is suppressed. Further, the lens 45 has, in plan view, a substantially rectangular shape elongated in the longitudinal direction. Note that, the shape of the lens 45 is not limited thereto. For example, the lens 45 may be formed into an elliptical shape elongated in the longitudinal direction.

The control device 10 controls the luminance of the LED modules 41 based on the video data input to the control device 10. As described above, every partial area E is associated with one or a plurality of LED modules 41. The control device 10 controls the luminance for each of the LED modules 41 separately or for each group of the plurality of LED modules 41 associated with one partial area E, separately. That is, in a case where one LED module 41 is associated with one partial area E, the control device 10 separately controls the plurality of LED modules 41. Further, in a case where plural LED modules 41 are associated with one partial area E, all LED modules 41 on the substrate 42 are divided into plural groups with reference to the partial area E and the control device 10 controls the luminance for each of groups, separately.

Figure 8:
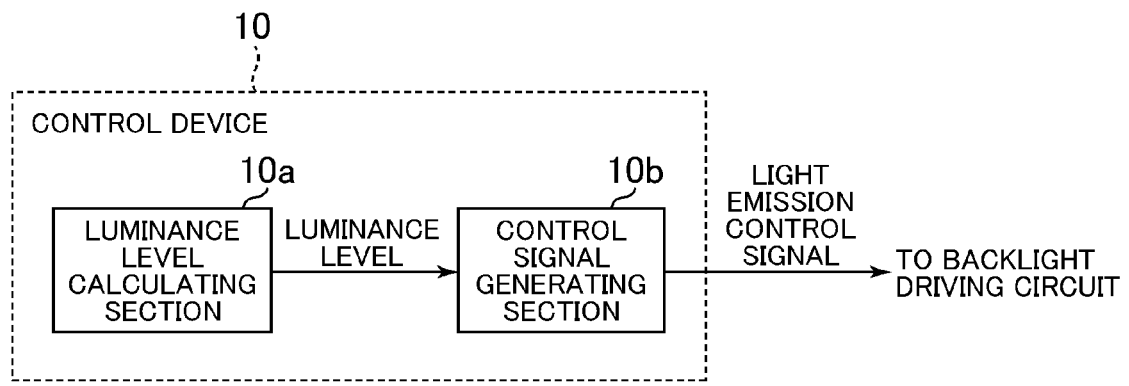
FIG. 8 is a block diagram illustrating a function of a control device included in the above-mentioned liquid crystal display device.

Hereinafter, an example of the processing executed by the control device 10 will be described. FIG. 8 is a block diagram illustrating a function of the control device 10. As illustrated in FIG. 8, the control device 10 includes a luminance level calculating section 10a and a control signal generating section 10b.

The luminance level calculating section 10a calculates the luminance level required for the one or more LED modules 41 associated with each of the partial areas E based on the video data input to the control device 10. The luminance level calculating section 10a executes this processing for each of the partial areas E.

For example, the luminance level calculating section 10a calculates the maximum value of the gray scale values of the plurality of pixels forming the partial area E, based on the video data input to the control device 10. And then, based on the maximum value, the luminance level calculating section 10a calculates the luminance level necessary for the LED module 41 associated with the same partial area E. For example, the luminance level calculating section 10a increases the luminance level of the LED module 41 as the maximum value increases.

Further, as another example, the luminance level calculating section 10a calculates the average of the gray scale values of the plurality of pixels provided in the partial area E, based on the video data input to the control device 10. Then, based on the average, the control device 10 calculates the luminance level necessary for the LED module 41 associated with the partial area E. For example, the luminance level calculating section 10a increases the luminance level of the LED module 41 as the average increases.

Further, the luminance level calculating section 10a may calculate the luminance level required for the LED module 41 based not only on the gray scale values of the pixels forming the partial area E but also on a distance between the same LED module 41 and each of the pixels of the partial area E in the length direction of the partial area E (Y1-Y2 direction) (in other words, a distance between the center line defining the center in the width direction of the substrate 42 and each of the pixels). With this processing, in a case where a pixel positioned away from the LED module 41 has a high gray scale value, the pixel can also be irradiated with light of appropriate intensity.

For example, the luminance level calculating section 10a weights the gray scale value of each pixel with the distance from the LED module 41 to the pixel and then calculates the average (weighted average) of the gray scale values of the pixels forming one partial area E. That is, the luminance level calculating section 10a multiplies the gray scale value of each pixel by a factor defined in accordance with a distance from the LED module 41 to the pixel, and calculates the average of the values obtained by the multiplication. The factor is defined, for example, such that it is increased in accordance with the distance from the LED module 41. Then, the luminance level calculating section 10a calculates the luminance level required for the LED module 41 based on the weighted average. For example, the luminance level calculating section 10a increases the luminance level of the LED module 41 as the weighted average increases.

Further, as still another example, the luminance level calculating section 10a may weight the gray scale values of the pixels forming each partial area E with the distance from the LED module 41 to each of the same pixels, and then may calculate the maximum value among the weighted values. Then, the luminance level calculating section 10a may calculate the luminance level required for the LED module 41 based on the maximum value. For example, the luminance level calculating section 10a increases the luminance level of the LED module 41 as the maximum value increases.

Note that, the weighting performed in accordance with the distance is not necessarily performed for each of the pixels. For example, one partial area E may further be sectioned into a plurality of small areas in accordance with the distance from the LED module 41. Then, the weighting of the gray scale value may be performed for each of the pixel groups each formed of plural pixels forming the small area. That is, the gray scale value of plural pixels forming one small area may be weighted with a common factor. With this calculation, it is possible to reduce load on the processing when the luminance level is calculated.

The image processing for adjusting the luminance of the LED modules 41 in accordance with the gray scale value of each pixel is called local dimming control or area control. When the LED is lit in displaying black image, the contrast of the display screen is still about several 1,000:1 because the light leakage from the liquid crystal panel occurs. On the other hand, the above local dimming control enables the contrast to be several 10,000:1 or larger in displaying black image, because the luminance of the LED module 41 is reduced in accordance with the gray scale value indicating black. Further, with the reduced luminance of the LED module 41, the power consumption of the backlight unit can be reduced.

As described above, the mode for adjusting the luminance for each LED module 41 in accordance with the gray scale value has a good effect of reducing the power consumption and improving the contrast. However, the mode leads to increasing the number of control circuits and then a cost problem. In order to solve this problem, the plurality of LED modules 41 may be divided into a plurality of blocks (groups), and the plurality of LED modules 41 forming each of the block may be controlled as one unit. For example, the luminance of LED modules 41 in one block may be controlled based on the average of the gray scale values of the pixels associated with the LED modules 41 forming the one block. This mode can reduce the number of the control circuits. Compared to the mode of controlling the luminance for each of the LED modules 41 separately, the mode of controlling the luminance for each block separately may reduce the fineness of the contrast adjustment of the displayed image. However, by determining the number of the LED modules 41 within one block in consideration of the cost, it is possible to obtain sufficient effects of both the improvement of the contrast and the reduction of the power consumption without causing increase in cost. Note that, the mode of controlling the luminance for each of the blocks is basically the same as that of adjusting and controlling the luminance of the LED modules 41 separately.

The control signal generating section 10*b* generates a control signal (hereinafter, referred to as light emission control signal) for drive the LED module 41 to emit light at a luminance level calculated by the luminance level calculating section 10*a*, and outputs the light emission control signal to the backlight driving circuit 5. The control signal generating section 10*b* generates the light emission control signal for each of the one or more LED modules 41 associated with one partial area E. The control signal generating section 10*b* generates the light emission control signal such that a current supplied to the LED module 41 becomes larger as the luminance level required for the LED module 41 becomes higher.

In the liquid crystal display device 1, the substrate 42 has a smaller width in the direction (that is, the width direction of the substrate 42) perpendicular to the length direction of the substrate 42 than the width of the liquid crystal panel 2 in the width direction of the substrate 42. The plurality of LED modules 41 are aligned along the length direction of the substrate 42. Further, the LED modules 41 are respectively assigned to the plurality of partial areas E defined on the liquid crystal panel 2, and each partial area E is extended in the width direction of the substrate 42. The LED modules 41 have lenses 45 respectively disposed thereover and expanding light from the LED modules 41 toward the partial areas E of the liquid crystal panel 2, respectively. Therefore, it is possible to direct the light toward the entire liquid crystal panel 2 while reducing the number of the LED modules 41. Further, the control device 10 controls each of the plurality of light sources separately or each of groups into which the plurality of light sources is divided, separately. This control can improve the contrast of the display screen.

Note that, the present invention is not limited to the liquid crystal display device 1 described above, and various modifications can be made thereto.

For example, in the description above, each of the lenses 45 directs the light emitted from the LED module 41 toward both the upper side and the lower side of the substrate 42. However, the liquid crystal display device may be provided with a lens for expanding the light emitted from the LED module 41 concentratedly toward the upper side of the substrate 42 and a lens for expanding the light emitted from the LED module 41 concentratedly toward the lower side of the substrate 42.

Figure 9:
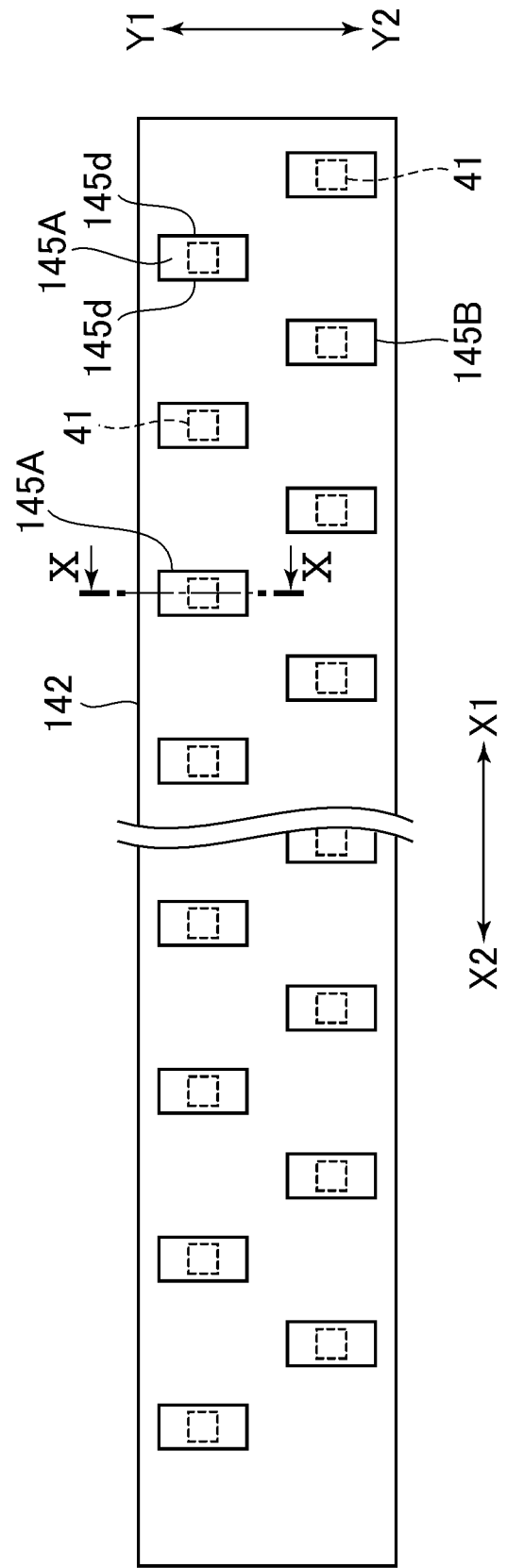
FIG. 9 is a plan view of a substrate included in a liquid crystal display device according to another embodiment of the present invention.
Figure 10:
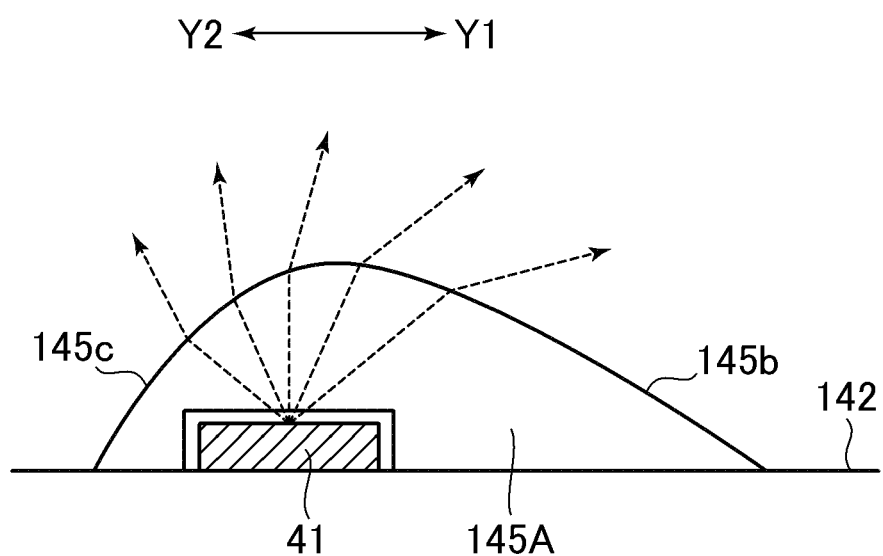
FIG. 10 is a cross-sectional view taken along the line X-X of FIG. 9.

FIG. 9 is a plan view of a substrate 142, illustrating an example of this mode, and FIG. 10 is a cross-sectional view taken along the line X-X of FIG. 9.

As illustrated in FIG. 9, the substrate (light source section) 142 has, similarly to the substrate 42, a shape elongated in the lateral direction (X1-X2 direction). Also the substrate 142 has the plurality of LED modules 41 arranged thereon and aligned in the length direction of the substrate 142. In the example described here, the LED modules 41 are aligned in a plurality of lines (two lines in this example). Further, the LED modules 41 arranged in one line and the LED modules 41 arranged in the other line are alternately arranged in the lateral direction. This arrangement can increase the position density of the LED modules 41.

The LED modules 41 have lenses 145A or 145B disposed thereover. In this example, the lenses 145A (hereinafter, referred to as upper lens) are disposed over the LED modules 41 in the upper line of the two lines of the LED modules 41. Further, the lenses 145B (hereinafter, referred to as lower lens) are disposed over the LED modules 41 in the lower line of the two lines of the LED modules 41.

LED modules 41 are respectively assigned to the partial areas of the liquid crystal panel 2 which are extended in the width direction of the substrate 142. In the example described here, the LED module 41 in the upper line is associated with a partial area extended upwardly from a position directly opposing to the substrate 142 (that is, a center portion in the longitudinal direction of the liquid crystal panel 2). On the other hand, the LED module 41 in the lower line is associated with a partial area extended downwardly from the position facing the substrate 142.

The upper lens 145A and the lower lens 145B expand the light emitted from the LED module 41 in directions opposite to each other. In this example, the partial area to be associated with the upper lens 145A is extended upwardly, and thus the upper lens 145A upwardly expands the light emitted from the LED module 41. In other words, the upper lens 145A enlarges the divergence angle of the light (see θ1 of FIG. 6) biasedly toward the upper side.

As illustrated in FIG. 10, the upper lens 145A has a light exiting surface (upper surface) 145*a* swelling toward the liquid crystal panel 2. The light exiting surface 145*a* includes a mildly-inclined surface 145*b* and a steeply-inclined surface 145*c*. The mildly-inclined surface 145*b* is inclined such that it is extended toward the upper side from the top of the upper lens 145A while becoming closer to the substrate 142. The steeply-inclined surface 145*c* is inclined such that it is extended toward the lower side from the top while becoming closer to the substrate 142. The inclination of the steeply-inclined surface 145*c* is larger than that of the mildly-inclined surface 145*b*. With such a shape, the upper lens 145A can direct the light emitted from the LED module 41 toward the upper side compared to the lower side.

Further, in this example, as illustrated in FIG. 9, the upper lens 145A has, similarly to the lens 45 described above, a pair of side surfaces 145*d* extended downwardly from the right and left edges of the light exiting surface 145*a* toward the substrate 142. In this example, the side surfaces 145*d* are formed upright with respect to the substrate 142, that is, formed so as to be substantially parallel to the optical axis of the LED module 41. Therefore, the divergence angle of light is hardly enlarged in the lateral direction (length direction of the substrate 142) by the upper lens 145A.

The partial area associated with the lower lens 145B is extended downwardly, and thus the lower lens 145B downwardly expands the light emitted from the LED module 41. In other words, the lower lens 145B enlarges the divergence angle of the light biasedly toward the lower side. In this example, the lower lens 145B has the same shape as the upper lens 145A, but its orientation on the substrate 142 is different from that of the upper lens 145A. That is, the lower lens 145B and the upper lens 145A are symmetrically arranged about a center line defining the center in the width direction of the substrate 142. With this arrangement, the lower lens 145B can direct the light emitted from the LED module 41 toward the lower side compared to the upper side.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a liquid crystal panel having a width in a first direction and a length in a second direction perpendicular to the first direction;
   a backlight unit comprising a light source section facing a rear surface of the liquid crystal panel, the light source section comprising a substrate and a plurality of light sources arranged on the substrate to face the rear surface of the liquid crystal panel, the light source section having a width in a first direction and a length in a second direction perpendicular to the first direction, the light source section being oriented so that the length of the light source section corresponds to the length of the liquid crystal display panel;
   a plurality of lenses facing the rear surface of the liquid crystal display panel, respective ones of the plurality of lenses being located between respective ones of the plurality of light sources and the rear surface of the liquid crystal panel; and
   a control device for controlling luminance of the plurality of light sources, wherein:
   the width of the light source section is smaller than the width of the liquid crystal panel;
   the liquid crystal panel is sectioned into a plurality of illumination zones that extend in the first direction and are arranged side by side along the second direction
   the plurality of light sources are arranged along the length of the light source section;
   the plurality of light sources are respectively assigned to the plurality of illumination zones so that one or a plurality of ones of the light sources are assigned to respective ones of the illumination zones defined on the liquid crystal panel,
   the plurality of lenses respectively expand light from the plurality of light sources toward the plurality of illumination zones of the liquid crystal panel; and
   the control device controls the luminance of each of the one or the plurality of ones of the plurality of light sources assigned to each of the plurality of illumination zones, separately, based on video data input to the control device.

2. The liquid crystal display device according to claim 1, wherein the lenses are so formed as to expand the light emitted from the each of the plurality of light sources concentratedly in the first direction.

3. The liquid crystal display device according to claim 2, wherein:
   the lenses include first lenses and second lenses;
   the first lenses are so formed as to expand the light emitted from the corresponding light sources concentratedly toward one side in the first direction; and
   the second lenses are so formed as to expand the light emitted from the corresponding light sources concentratedly toward the other side in the first direction.

4. The liquid crystal display device according to claim 1, wherein the light source section directly faces a center portion of the liquid crystal panel which is defined as a center portion in the first direction.

5. The liquid crystal display device according to claim 4, further comprising a plurality of optical sheets arranged between the light source section and the liquid crystal panel.

6. The liquid crystal display device according to claim 1, further comprising a reflective sheet for reflecting light from the plurality of light sources toward the liquid crystal panel, wherein
   the reflective sheet is curved such that the reflective sheet swells toward the opposite side to the liquid crystal panel.

7. The liquid crystal display device according to claim 1, wherein the plurality of light sources on the light source are aligned in one line.

8. The liquid crystal display device according to claim 1, wherein the plurality of light sources on the light source section are aligned in two lines.

9. The liquid crystal display device according to claim 1, wherein the backlight unit further comprises a reflector sheet that has, in plan view, a rectangular shape with a size corresponding to a size of the liquid crystal panel, and wherein the reflector sheet has a shape such that the reflector sheet is curved to become closer to the liquid crystal panel with increasing distance from the substrate of the light source section.

* * * * *